Patented Sept. 11, 1928.

1,684,331

UNITED STATES PATENT OFFICE.

KARL THIESS, BERNHARD DEICKE, AND ROBERT SCHMIDLIN, OF HOCHST-ON-THE-MAIN, GERMANY, ASSIGNORS TO GRASSELLI DYESTUFF CORPORATION, OF NEW YORK, N. Y., A CORPORATION OF DELAWARE.

POLYARYLAMINE DYESTUFF AND PROCESS OF PRODUCING THE SAME.

No Drawing. Application filed May 10, 1926. Serial No. 108,111, and in Germany May 22, 1925.

Our present invention relates to the preparation of new dyestuffs.

We have found that extremely valuable dyestuffs are obtained which are more or less easily soluble in water and dye animal fibres greenish-yellow to brown-red tints of good fastness to light and fulling, by condensing 1.3-dihalogen-2.6-dinitrobenzene or substitution products thereof with two molecules of a 4-aminodiphenylaminosulfonic acid or a substitution product thereof.

The condensation takes place with elimination of the two halogen atoms and is preferably effected in water at boiling temperature and in presence of an acid-binding agent; the reaction gives very good yields. In order to accelerate the reaction there may, as usual in the case of reactions where halogen is exchanged, be added a catalyst (for instance a copper compound) or a small quantity of an organic solvent, such as alcohol. The application of pressure may in most cases be dispensed with.

The following examples serve to illustrate our invention without restricting our invention thereto. The parts are by weight.

1. 23.7 parts of 1.3-dichloro-4.6-dinitrobenzene are suspended in 15 times the quantity of water to which some alcohol has been added. This suspension is then run within 15 hours into an alkaline solution, obtained from 61.8 parts of 4'-nitro-4-amino-diphenylamin-2'-sulfonic acid in 400 parts of water and 22 parts of calcined sodium carbonate; thus a solution of a brown color is obtained. After having again boiled this solution for some hours, the resulting dark-brown solution is filtered when hot and from the filtrate the salt of the coloring matter is extracted by means of potassium chloride or sodium chloride. The dyestuff thus obtained dyes wool from a slightly acid bath very intense yellow tints of good fastness to fulling and light. The dyestuff has the following formula:

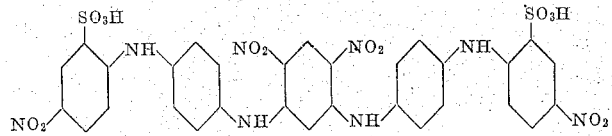

2. If for the 4'-nitro-4-aminodiphenylamin-2'-sulphonic acid, used in Example 1, are substituted 52.8 parts of 4-amino-diphenylamin-2-sulfonic acid, the resulting dyestuff dyes animal fibres a brown-yellow tint of good fastness to light and fulling.

This dyestuff may be represented by the following graphical formula:

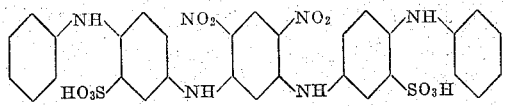

3. If the operations according to Example 1 are carried out by using 56 parts of 4'-methyl-4-aminodiphenylamin-2-sulfonic acid instead of 4'-nitro-4-aminodiphenylamin-2'-sulfonic acid, a dyestuff is obtained which dyes wool brilliant orange-yellow tints. The dyestuff corresponds to the following graphical formula:

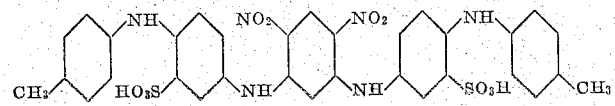

4. 25.1 parts of 2.6-dichloro-3.5-dinitrotoluene are combined with 500 parts of water, in which 30 parts of calcined sodium carbonate have been dissolved, and 52.8 parts of 4-aminodiphenylamin-2-sulfonic acid. After addition of ½ part of copper sulfate the whole is boiled for 20 hours. The resulting deep reddish-brown solution is filtered and the coloring matter is salted out. The dyestuff dyes wool a brown tint of good fastness to light and fulling. It may be represented by the following graphical formula:

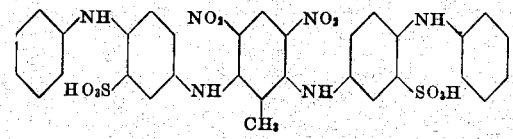

The new dyestuffs of the present invention may be represented by the general formula:

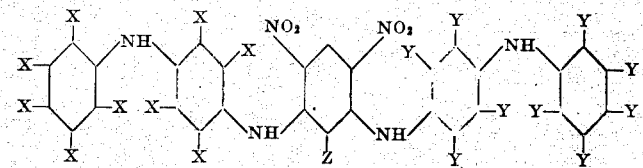

wherein at least one symmetrical X—Y pair represents sulfonic acid groups, the other symmetrical X—Y pairs represent hydrogen or a monovalent substituent and Z represents hydrogen or methyl.

In the following claims by the terms "a 1.3-dihalogen-4.6-dinitrobenzene compound" and "a 4-aminodiphenylaminsulfonic acid compound" we understand not only these bodies themselves, but also the derivatives thereof.

We claim:

1. Process of producing dyestuffs, which consists in condensing a 1.3-dihalogen-4.6-dinitrobenzene compound with two molecules of a 4-aminodiphenylaminsulfonic acid compound.

2. Process of producing dyestuffs, which consists in condensing a 1.3-dichloro-4.6-dinitrobenzene compound with two molecules of a 4-aminodiphenylaminsulfonic acid compound.

3. Process of producing dyestuffs, which consists in condensing a 1.3-dihalogen-4.6-dinitrobenzene compound with two molecules of a 4-amino-1-diphenylamin-2-sulfonic acid compound.

4. Process of producing dyestuffs, which consists in condensing a 1.3-dichloro-4.6-dinitrobenzen, compound with two molecules of a 4-amino-1-diphenylamin-2-sulfonic acid compound.

5. As a new product, the dyestuff of the following composition

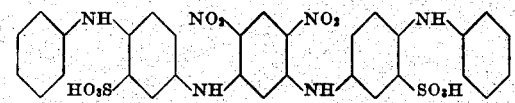

6. Material dyed with the dyestuff defined in claim 5.

7. As new products, dyestuffs of the general formula:

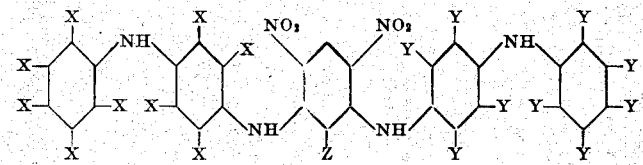

wherein at least one symmetrical X—Y pair represents sulfonic acid groups, the other symmetrical X—Y pairs represent hydrogen or a monovalent substituent and Z represents hydrogen or methyl.

8. Material dyed with a dyestuff of claim 7.

In testimony whereof, we affix our signatures.

KARL THIESS.
BERNHARD DEICKE.
ROBERT SCHMIDLIN.